United States Patent [19]

Yamashita et al.

[11] Patent Number: 5,178,691
[45] Date of Patent: Jan. 12, 1993

[54] PROCESS FOR PRODUCING A RARE EARTH ELEMENT-IRON ANISOTROPIC MAGNET

[75] Inventors: Fumitoshi Yamashita, Ikoma; Masami Wada, Hirakata, both of Japan

[73] Assignee: Matsushita Electric Industrial Co., Ltd., Osaka, Japan

[21] Appl. No.: 706,233

[22] Filed: May 28, 1991

[30] Foreign Application Priority Data

May 29, 1990 [JP] Japan .................................. 2-141073
Jul. 3, 1990 [JP] Japan .................................. 2-176035
Jul. 3, 1990 [JP] Japan .................................. 2-176036

[51] Int. Cl.$^5$ ............................................. H01F 1/02
[52] U.S. Cl. ................................. 148/101; 148/104; 419/12; 419/52
[58] Field of Search ............... 148/101, 104, 102, 103; 419/12, 52

[56] References Cited

U.S. PATENT DOCUMENTS

| 2,355,954 | 8/1944 | Cremer | 419/52 |
| 4,792,367 | 12/1988 | Lee | 148/104 |
| 4,844,754 | 7/1989 | Lee | 148/302 |

FOREIGN PATENT DOCUMENTS

| 0306928 | 3/1989 | European Pat. Off. | 148/101 |
| 60-100402 | 6/1985 | Japan. | |
| 61-43783 | 3/1986 | Japan. | |
| 61-111514 | 5/1986 | Japan. | |

Primary Examiner—John P. Sheehan
Attorney, Agent, or Firm—Ratner & Prestia

[57] ABSTRACT

A process for producing a rare earth element-iron-boron anisotropic magnet that may generate a strong static magnetic field in vacant spaces of a magnetic circuit mounted in a motor is disclosed. The process comprises the steps of placing a billet produced of rapid solidification powder of a rare earth element-iron-boron alloy into a mold cavity, applying a primary pressure to said billet, while allowing a primary current to pass through said billet, applying to said billet a secondary pressure which is increased up to at least five times as much as the primary pressure, and applying a secondary current greater than the primary current through said billet, wherein the billet is finally subjected to plastic deformation at the temperature between the crystalline temperature and 750° C.

10 Claims, 10 Drawing Sheets

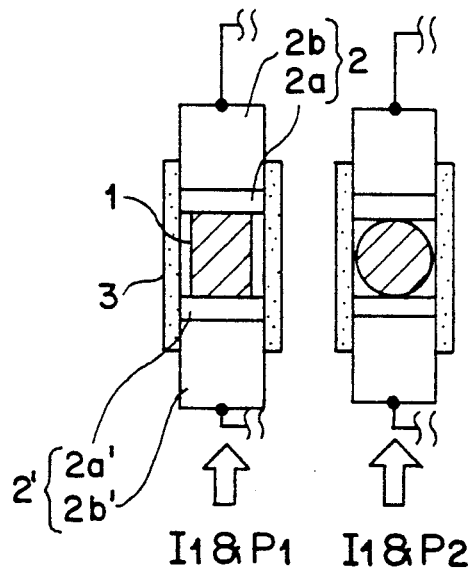
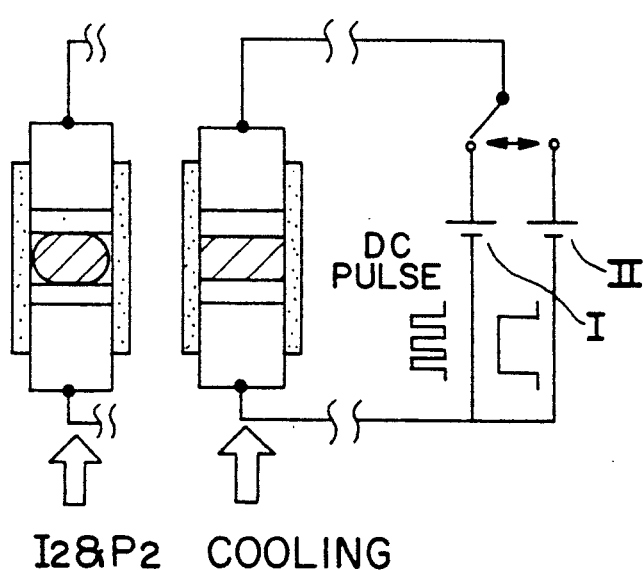
FIG. 1(a)   FIG. 1(c)
I1&P1   I1&P2   I2&P2   COOLING
FIG. 1(b)   FIG. 1(d)

Nd14 Fe76 Co4 B6

Nd14 Fe76 Co4 B6

Nd14 Fe76 Co4 B6

Nd14 Fe76 Co4 B6

Nd14 Fe76 Co4 B6

Nd14 Fe76 Co4 B6

Nd$_x$(Fe$_{0.8}$Co$_{0.2}$)$_{94-x}$B$_6$

Nd13 Fe63 Co18 B6

Nd14 Fe76 Co4 B6

PROCESS FOR PRODUCING A RARE EARTH ELEMENT-IRON ANISOTROPIC MAGNET

BACKGROUND OF THE INVENTION

1. Field of the Invention

This invention relates to a process for producing a rare earth element-iron-boron magnet that may generate a strong static magnetic field in vacant spaces of a magnetic circuit mounted in a motor, which is used for example in audio visual systems, office automation systems, etc. More particularly, it relates to a process for producing a rare earth element-iron-boron magnet comprising applying pressure to a billet of a rapid solidification powder of a rare earth element-iron-boron alloy while allowing a current to pass through the billet to conduct a plastic deformation. Said rapid solidification powder is a mixture of crystalline structures and amorphous structures.

2. Description of the Prior Art

Said motor requires a magnet with high residual induction and thermal stability. For that reason, an Sm-Co type sintered magnet has been used in the past. However, in recent years a rare earth element-iron-boron sintered magnet with high residual induction which is produced according to a powder metallurgy method has been utilized as described in Japanese Patent Publication No. Laid Open 61-111514, which may urge the development of a compact motor with high output powder.

On the other hand, it is well known that a magnetic material is subjected to a plastic deformation for providing its texture with magnetic anisotropy, thereby obtaining excellent magnetic properties in a certain direction. For example, a texture of grain oriented silicon steel plate which is formed by a roll magnetic anisotropy method is well know. Also, there are other magnets known in the art, for example, a Mn-Al-C, and rare earth element-iron-boron rapid solidification magnets which are made by plastic deformation techniques of magnetic materials such as an extruding procedure, die-upsetting procedure, and the like. These magnetic anisotropy techniques are based on a principle that when the magnetic material is subjected to plastic deformation, there is a certain relationship between the direction of stress or strain and the axis of easy magnetization of the crystals of the materials.

A rare earth element-iron-boron rapid solidification magnet is produced by (1) melting a raw material mixture of Nd, Fe, B, and other added elements as needed, (2) rapid solidification the melted mixture by a melt-spinning procedure to form a rapid solidification flake powder of fine crystal having an $R_2TM_{14}B$ phase, wherein R is neodymium(Nd) and/or praseodymium(Pr), TM is iron(Fe) and/or cobalt(Co), and B is boron, as a major phase with a grain size of about 20-500 nm, (3) applying pressure to the rapid solidification powder to form a billet at high temperatures, and then (4) subjecting the billet to plastic deformation (Japanese Laid-Open Patent Publication 60-100402). For example, the raw material mixture is melted by an arc discharge, and then rapidly solidified by a single roll method under Ar atmosphere to form a rapid solidification flake powder with a thickness generally of 20-30 μm which is a mixture of crystalline structures and amorphous structures. The rapid solidification powder is roughly ground to 32 mesh or less. Then, a pressure of about 3 tonf/cm² is applied to the ground rapid solidification powder in a hard metal mold. The pressed rapid solidification powder is then subjected to high-frequency heating at a temperature of 600° to 800° C. while applying a pressure of 0.5-2 tonf/cm² to form a billet having full density. Then, the billet is placed in a mold cavity of the hard metal mold of which the surface is treated with a graphite lining, and then subjected to plastic deformation under a pressure of 0.5-2.5 tonf/cm² during a high-frequency heating to form a rare earth element-iron-boron.

Although these conventional plastic deformation techniques disclose the production of magnets with magnetic anisotropy, they do not disclose any particular method for forming a specific shape, or maintaining magnetic properties.

According to this plastic deformation technique, the billet of the rapid solidification powder is held for a long period of time such as several hundred seconds at temperatures higher than its crystallization temperature, or heated to an elevated temperature of 750° C. or more, the fine crystals of the rapid solidification powder become larger, which may cause the reduction of intrinsic coercivity.

The thermal stability of magnetic properties such as intrinsic coercivity of magnet depends generally on the value of the intrinsic coercivity, and its temperature coefficient. When the intrinsic coercivity of magnet is larger, or its temperature coefficient is smaller, the thermal stability of the magnet will be improved. For example, the intrinsic coercivity of a sintered magnet has been increased to 20 kOe by the addition of dysprosium(Dy) or other elements in order to maintain its thermal stability. However, when the intrinsic coercivity of the magnet is increased, the residual induction for an applied magnetic field is reduced, which makes it difficult to generate a strong static magnetic field in vacant spaces of a magnetic circuit. Therefore, it is desirable that the thermal stability of a magnet be improved by reducing the temperature coefficient of intrinsic coercivity of the magnet. For instance, a rare earth element-iron-boron sintered magnet or rapid solidification magnet with a maximum energy product of 30 MGOe or more has the temperature coefficient of intrinsic coercivity of −0.6%/°C. The above value of about −0.6%/°C. is not sufficiently low as a temperature coefficient of the intrinsic coercivity, therefore, because of a great demagnetization by heat, the stability against the heat from a magnetic circuit cannot be sufficiently secured. For that reason, reducing the temperature coefficient to −0.5%/°C. or less is preferable. However, it is difficult to reduce the temperature coefficient of intrinsic coercivity of the rapid solidification magnet to −0.5%/°C. or less by conventional plastic deformation techniques.

Also, when a sintered magnet is produced by these plastic deformation techniques, its magnetic properties may be damaged in the plastic deformation process for providing it with magnetic anisotropy. In the case of the sintered magnet, an alloy powder ground to the size of particle which can become a single magnetic domain is formed in the magnetic field before sintering. When a small and thin magnet is formed in the magnetic field, however, the orientation of the particle in the magnetic field tends to be disturbed due to the compressed pressure because the direction of the magnetic field is identical to that of the compression. For example, it is difficult for a thin magnet or about 1 mm thickness to obtain a residual induction of 11 kg or more because of the disturbed orientation of the particle.

SUMMARY OF THE INVENTION

The process for producing a rare earth element-iron-boron anisotropic magnet of this invention, which overcomes the above-discussed and numerous other disadvantages and deficiencies of the prior art, comprises the steps of: placing a billet produced of rapid solidification powder of a rare earth element-iron-boron alloy into a mold cavity, applying a primary pressure to said billet, while allowing a primary current to pass through said billet, applying to said billet a secondary pressure which is increased up to at least five times as much as the primary pressure, and applying a secondary current greater than the primary current through said billet, wherein the billet is finally subjected to plastic deformation at the temperature between the crystalline temperature and 750° C.

In a preferred embodiment, the mold cavity is formed between a pair of electrodes which are located inside an electrically non-conductive die, wherein the electrodes have a ratio of specific electric resistance to volume specific heat in the range of $10^{-4}$ to $10^{-2}$ in which the volume specific heat is defined by a product of specific gravity and specific heat.

In a preferred embodiment, a film of a mixture including boron nitride(BN) and an organic polymer is formed on the top surface of the electrodes to be contacted with the billet, and at least one part of the film is subjected to dielectric breakdown by discharging the film and applying a primary current.

In a preferred embodiment, the electrode is comprised of electrically conductive ceramics at the side of the billet, and graphite at the other side.

In a preferred embodiment, the billet side of the electrode, and the non-conductive die are made from a material containing SIALON ($Si_{6-z}Al_zO_zN_{6-z}$; z is 1–4.60).

In a preferred embodiment, the rapid solidification powder is a flake powder having an $R_2TM_{14}B$ phase, wherein R is at least either neodymium(Nd) or praseodymium(Pr), TM is at least either iron(Fe) or cobalt(Co), and B is boron, as a major phase with the mean grain size of 500 nm or less, and said rare earth element-iron alloy contains 13 to 15 atomic percent of at least either neodymium(Nd) or praseodymium(Pr), 5 to 7 atomic percent of boron(B), and the balance of at least either iron(Fe) or cobalt(Co).

In a preferred embodiment, the billet is formed by mixing an R-TM-B alloy, wherein R is at least either neodymium(Nd) or praseodymium(Pr), TM is at least either iron(Fe) or cobalt(Co), B is boron, with an R-TM-B-Ga alloy, wherein R is at least either neodymium(Nd) or praseodymium(Pr), TM is at least either iron(Fe) or cobalt(Co), B is boron, and Ga is gallium, and then solidifying the mixture.

In a preferred embodiment, the billet is formed by solidifying the flake rapid solidification powder with a diameter of 53 μm or more.

In a preferred embodiment, the billet has a relative density of 95% or less.

In a preferred embodiment, the ratio of the sectional area S of said cavity to the sectional area $S_o$ of the billet is 2 to 3 in which both sectional areas are located at the right angle of the pressure.

Thus, the invention described herein makes possible the objectives: (1) providing a plastic deformation technique of a rapid solidification powder of a rare earth element-iron-boron alloy by which a rare earth element-iron-boron magnet with magnetic anisotropy and excellent dimensional precision is produced at the temperature between 750° C. and the crystallization temperature for a short period of time; (2) providing a rare earth element-iron-boron magnet having good thermal stability that can generate a strong static magnetic field in vacant spaces of a magnetic circuit even under a relatively lower magnetic field for magnetization; and (3) providing a rare earth element-iron-boron with relatively less disturbed orientation.

BRIEF DESCRIPTION OF THE DRAWINGS

This invention may be better understood and its numerous objectives and advantages will become apparent to those skilled in the art by reference to the accompanying drawings as follows:

FIGS. 1(a), 1(b), 1(c) and 1(d) are schematic views showing the plastic deformation steps in the process for producing a rare element-iron-boron magnet of this invention;

DESCRIPTION OF THE PREFERRED EMBODIMENT

Figure 2:
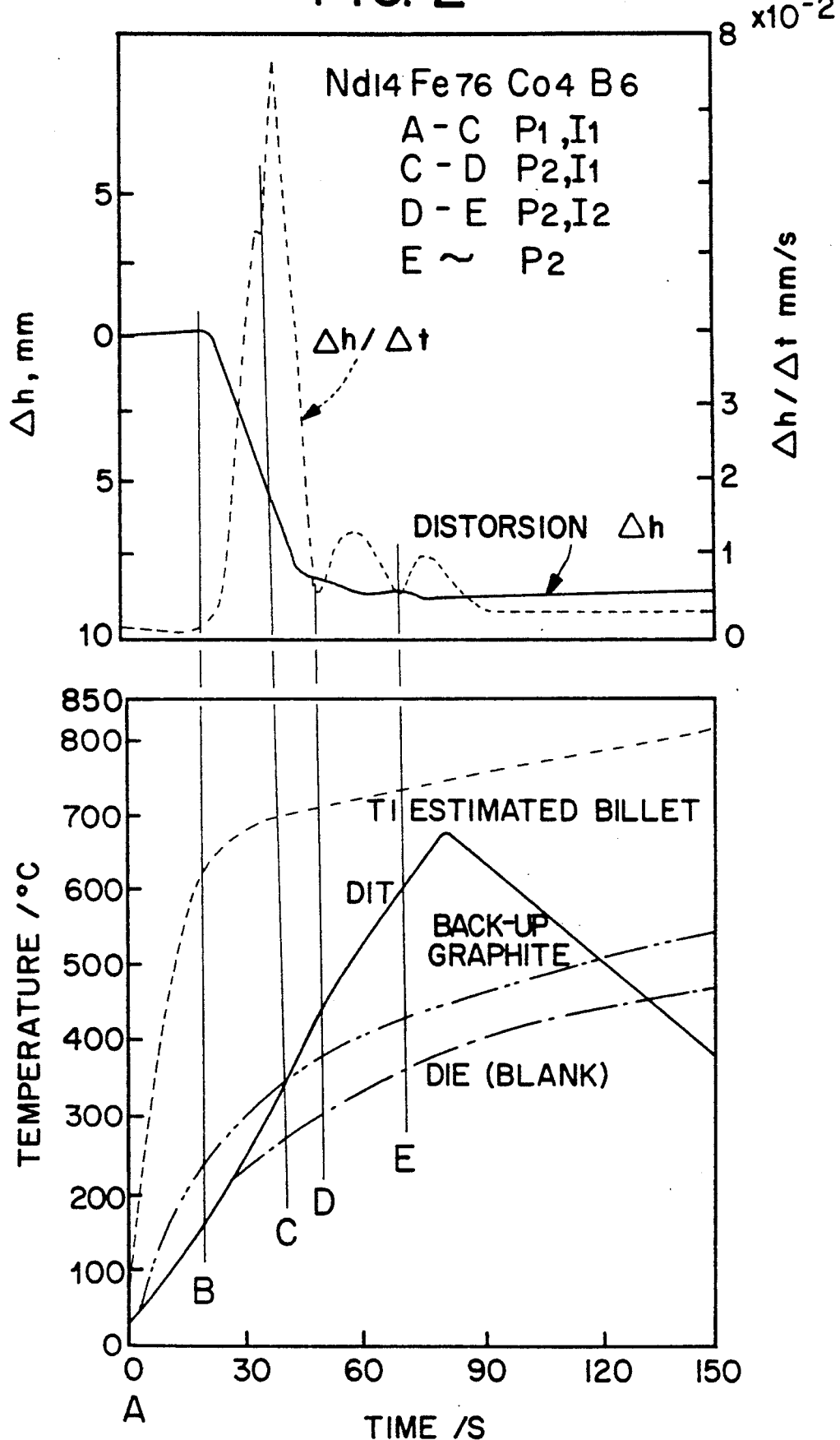
FIG. 2 is a graph showing the relationship between the plastic deformation conditions and the temperature of mold parts.

The following illustrates a plastic deformation technique of a billet of a rapid solidification powder by applying pressure while passing a current through the billet, referring to the drawings.

FIGS. 1(a), 1(b), 1(c) and 1(d) are sectional views showing the steps of the plastic deformation process of the billet.

The billet 1 is placed in a mold cavity formed by a pair of electrodes 2 and 2', and an electrically non-conductive die 3. The electrodes 2 and 2' are comprised of the electrode parts 2a and 2a' at the side of the billet, and the electrode parts 2b and 23b' at the other side. Also, a film for a mixture including boron nitride(BN) and an organic polymer is formed on the top surface of the electrode parts 2a and 2a'. In FIG. 1, a 30 V pulse voltage source (I), and a 6 V direct constant-current source (II) are connected electrically to the electrodes 2b and 2b' by a transfer switch through a pressure axis rod. There is provided a chamber outside the die 3, and electrodes 2 and 2' to evacuate the system around the billet, if any.

FIG. 2 is a graph showing the relationship between the distance of the electrodes $\Delta h$ moved from the original place in the direction of the pressure when the billet is subjected to plastic deformation, the differential curve of the distance $\Delta h/\Delta t$, and the temperature of the mold parts. The curve T1 corresponds to the temperature of the billet 1 measured by a thermocouple after removing the die 3. The symbols A, B, C, D and E refer to the stages of the plastic deformation technique.

The following illustrates the plastic deformation technique of a billet, referring to FIGS. 1(a), 1(b), 1(c) and 1(d), and FIG. 2.

First, uniaxial pressure is applied to the billet 1 through the electrodes 2 and 2'. The film of a mixture including boron nitride(BN) and an organic polymer is subjected to dielectric breakdown by pulse discharge from the operation of a 30 V pulse voltage source (I) between the electrodes 2 and 2' to ensure the electric conductivity between them while maintaining the pressure.

The step between the stages A and B in FIG. 2 corresponds to the step of FIG. 1(a), which comprises ensuring the electric conductivity between the electrodes 2 and 2', and then heating the electrodes 2 and 2', billet 1, and die 3 with Joule's heat generated from the primary current $I_1$ while applying the primary pressure $P_1$ to the billet. It can be seen from FIG. 2 that the temperature of the billet 1 is increased more rapidly than that of the die 3. In stage B of FIG. 2, the temperature of the billet reaches around its crystallization temperature (about 580° C.) at which the plastic deformation of the billet commences with the decrease of its viscosity.

The step between the stages B and C in FIG. 2 corresponds to the step of FIG. 1(b), in which the temperature increase of the billet 1 slows down due to the heat leakage, and then the temperature of the billet 1 is increased again when the plastically deformed billet comes into contact with the surface of the mold cavity of the die 3.

The step between the stages C and D in FIG. 2 corresponds to the step of FIG. 1(c), in which the plastic deformation of the billet 1 is accelerated by the secondary pressure $P_2$ of over about 200 kgf/cm² which is greater than the primary pressure $P_1$.

The step between the stages D and E in FIG. 2 corresponds to the step of FIG. 1(d), in which the billet 1 is formed in a specific shape by allowing the secondary current $I_2$ ($>I_1$) to pass through the billet 1.

As described above, the plastic deformation of the billet 1 is completed in a short period of time such as ten to one hundred seconds by the addition of Joule's heat generated from the current.

Next, the following illustrates the electrodes 2 and 2', and the electrically non-conductive die 3, both of which form the mold cavity.

A pair of electrodes should have a ratio of specific electric resistant($\rho/\Omega$cm) to volume specific heat(-cal/°C. g) in the range of $10^{-4}$ to $10^{-2}$ wherein the volume specific heat is defined by a product of specific gravity and specific heat. Preferably, the electrodes are comprised of electric conductive ceramics at the side of the billet, and graphite at the other side. The materials that can be used for the electric conductive ceramics include for example sintered composite ceramics of SIALON($Si_{6-z}Al_zO_zN_{6-z}$; z is 1–4.60), and carbides or nitrides of Group VI elements such as titanium(Ti), zirconium(Zr), hafnium(Hf), etc. However, the sintered composite ceramics of SIALON, and TiC, carbides or nitrides of Zr or Hf have less oxidation resistance at elevated temperatures, and therefore those containing SIALON and TiN are preferably used. The amount of addition of TiN is from 30 volume % in which each TiN phase starts contacting together in the sintered composite ceramics, to 70 volume % in which each TiN phase starts contacting together in the sintered composite ceramics, to 70 volume % in which the strength at elevated temperatures of the sintered composite ceramics starts decreasing, significantly. The sintered composite ceramics are suitable for use as an electrode material because they can be worked by an electric discharging machine to form an electrode of different shapes with high dimensional precision.

On the other hand, the electrodes at the other side of the billet are comprised of graphite so as to accelerate the temperature increase of the billet due to Joule's heat generated from the current passing through the electrodes in an initial stage of the plastic deformation. The temperature increase of the electrodes in the initial stage is effective for increasing rapidly the temperature of the billet to the crystallization temperature or more. Also, when the temperature of the billet reaches the crystallization temperature, both the reduction of calorific value and the heat leakage may slow down the temperature increase of the billet, so that it is easy to subject the billet to plastic deformation in such a specific range as between the crystallization temperature and 750° C. In other words, the specific electric resistance of graphite is reduced exponentially as the temperature increases from room temperature to 700° C. while its volume specific heat at 700° C. is approximately twice as much as the volume specific heat at room temperature, so that the calorific value generated from the primary current at the crystallization temperature is controlled to about 30–40% of that in room temperature. Therefore, after the temperature of the billet is increased rapidly to the crystallization temperature, it can be maintained between the crystallization temperature and 750° C. for about ten to one hundred seconds. Moreover, the specific electric resistance of ends. Moreover, the specific electric resistance of the electrically conductive materials such as TiN contained in the electrically conductive ceramics which comprise the electrodes at the side of the billet is increased linearly, so its calorific value is about twice as much as in room temperature. Thus, by allowing the secondary current to pass through the billet, it is advantageously subjected to plastic deformation so as to form a specific shape.

Additionally, the formation of a film of a mixture including boron nitride(BN) and an organic polymer on the top surface of the electrodes is effective for not only the reductions of the friction between the billet and the electrodes during the plastic deformation, but the smooth release of the resulting magnet from the mold cavity. The electrically non-conductive die is preferably made from SIALON itself not only because SIALON is inactive against most of rare earth elements such as Nd, Pr and the like, but because is has lower friction coefficient, excellent thermal strength at elevated temperatures, and durability for a mold.

The following illustrates a rapid solidification powder of rare earth element-iron-boron.

The rapid solidification powder of rare earth element-iron-boron alloy is a flake powder of fine crystal having an $R_2TM_{14}B$ phase, wherein R is neodymium(Nd) and/or praseodymium(Pr), TM is iron(Fe) and/or cobalt(Co), and B is boron, as a major phase with a mean grain size of 500 nm or less, and the rare earth element-iron alloy contains 13 to 15 atomic percent of neodymium(Nd) and/or praseodymium(Pr), 5 to 7 atomic percent of boron(B), and the balance of iron(Fe) and/or cobalt(Co). If the rare earth element-iron-boron alloy contains less than 13 atomic percent of Nb or Pr, more than 7 atomic percent or less than 5 atomic percent of B, or more than 20 atomic percent of Co, it is difficult to subject the billet to plastic deformation by allowing a current to pass through the billet. Also, if the amount of Nd or Pr is more than 15 atomic percent, the excess amount of Nd or Pr oozes out of the billet, which causes the reduction of smooth release of the billet from the mold cavity, and the reduction of the residual induction derived from the reduction of the saturation magnetization. On the other hand, the grain size of the major phase is adjusted to 500 nm or less because such a maximum grain size of the major phase that a single magnetic domain can be formed is about 300 nm, and if the grain size of the major phase is more than 300 nm, especially 500 nm, the resulting magnet has less intrinsic coercivity, and larger temperature coefficient of intrinsic coercivity, causing the reduction of the thermal resistance, regardless of the variety of alloy compositions.

Also, a rapid solidification powder of an R-TM-B-Ga alloy may be mixed with the aforementioned basis rapid solidification powder of R-TM-B alloy, wherein R is neodymium(Nd) and/or praseodymium(Pr), TM is iron(Fe) and/or cobalt(Co), B is boron, and Ga is gallium, in this invention. The rapid solidification powder of the R-TM-B-Ga alloy is prepared by adding 0.2–2 atomic percent of Ga to the rapid solidification powder of the R-TM-B alloy. The addition of the rapid solidification powder of the R-TM-B-Ga alloy has such an advantage that even when a thinner magnet is formed by subjecting the billet of the rapid solidification powder to plastic deformation by applying the secondary current, the reduction of intrinsic coercivity of the magnet can be prevented, thereby maintaining the thermal stability of the magnet. The amount of addition of the R-TM-B-Ga alloy, varied depending on the shapes of the magnet, is about 10–20% by weight for the total amount of the rapid solidification powder of the R-TM-B alloy for preventing the reduction of the residual induction when a thinner magnet of about 1 mm thickness is molded. Also, when only the rapid solidification powder of the R-TN-B alloy or R-TM-B-Ga alloy is used, the maximum energy product of the magnet is decreased as Fe is replaced with Co. However, when the rapid solidification powder of the R-TM-B-Ga alloy is mixed with the rapid solidification powder of the R-TM-B alloy, the maximum energy product of the magnet is not decreased significantly even in the presence of up to 18 atomic percent of Co, which may improve the temperature coefficient of the residual induction while maintaining the performance of the magnet.

Moreover, other elements such as Zn, Al, Si, Nb, Ta, Ti, Zr, Hf, W, and the like which prevent the growth of the crystal grains of the rapid solidification powder, and increase the intrinsic coercive force of the magnet may be add to the R-TM-B alloy and/or R-TM-B-Ga alloy in such an amount that the addition of these elements does not reduce the residual induction of the magnet, significantly.

The following illustrates the billet of a rapid solidification powder of a rare earth element-iron alloy.

The billet of a rapid solidification powder of a rare earth element-iron-boron alloy is preferably formed by fixing the flake rapid solidification powder with a grain size of 53 μm or more. This is because using a billet prepared by fixing the rapid solidification powder with a grain size of less than 53 μm, the intrinsic coercivity of the magnet is reduced. Also, the relative density of the billet is adjusted to 95% or less so as to prevent the reduction of the intrinsic coercivity.

The ratio of the sectional area S of the cavity to the sectional area $S_o$ of the billet, $S/S_o$ is preferably adjusted to 2 to 3 in which both sectional areas are located at the right angle of the applied pressure. If the ratio $S/S_o$ is less than 2, the resulting magnet does not have a residual induction of 11 kG or more. On the other hand, if the ratio $S/S_o$ is more than 3, the residual induction is not increased sufficiently, relative to the degree of the plastic deformation, which causes the decrease of the intrinsic coercivity.

EXAMPLES

The following example illustrate the present invention in detail. In these examples, the magnetic properties of the magnets were measured by using a recording flux meter at the temperature of 20±5° C. after a 50 kOe pulse magnetization.

EXAMPLE 1

An $Nd_{14}Fe_{76}Co_4B_6$ alloy was melted in an induction heating furnace, and the melted alloy was subjected to melt-spinning under Ar atmosphere to obtain a ribbon flake. It was identified from an X-ray diffraction that the ribbon flake was a mixture of crystalline structures and amorphous structures having an indeterminate shape with about 30 μm thickness. The ribbon flake was ground to a grain size of 53–350 μm, sieved, and charged into a mold cavity in the amount of 16 g. Then, a billet was formed by allowing a current to pass through it for heating under vacuum atmosphere of $10^{-1}$ to $10^{-3}$ Torr. The billet had a cylindrical shape with an outer diameter of 14 mm, and a relative density of 85%.

Then, the billet 1 was placed in the plastic deformation molding cavity shown in FIG. 1, which was comprised of a pair of electrode parts 2a and 2a' with an outer diameter of 19.960 mm and length of 5 mm at the side of the billet, a pair of electrode parts 2b and 2b' with an outer diameter of 19.95 mm and length of 20 mm at the other side, and an electrically non-conductive die 3 with an inner diameter of 20.00 mm and length of 40 mm. The electrode parts 2a and 2a' were made from TiN/SIALON composite ceramics having specific electric resistance ($\rho$) of $4 \times 10^{-4}$ Ωcm at room temperature, while the electrode parts 2b and 2b' were made from graphite having specific electric resistance ($\rho$) of $1.6 \times 10^{-3}$ Ωcm at room temperature. On the top surface of the electrode parts 2a and 2a', film of a mixture including boron nitride(BN) and an organic polymer was formed. The electrically non-conductive die 3 was made from SIALON.

First, the deformation device was evacuated to a vacuum atmosphere of $10^{-1}$ to $10^{-3}$ Torr. Then, while applying a uniaxial pressure to the billet 1 through the electrodes 2 and 2', the composite films were subjected partially to dielectric breakdown by discharging between the electrodes 2 and 2' over 15 seconds to ensure the electric conductivity between the electrodes 2 and 2'. Because the discharging current between the electrodes 2 and 2' was several mA or less, the temperature increase by Joule's heat was hardly observed in the billet 1.

Then, a primary pressure $P_1$ of 300 kgf/cm² per unit sectional area of the billet was applied to the billet 1 through the electrodes 2 and 2' while allowing a primary current $I_1$ of 300 A/cm² per unit sectional area of the billet to pass through the billet 1, thereby heating the electrodes 2 and 2', billet 1, and die 3 by Joule's heat. The temperature of the billet 1 was increased much more rapidly than that of the die 3. Only about 20 seconds after the primary current $I_1$ started to pass, the billet 1 was subjected to plastic deformation, and about 40 seconds later, the rate of the plastic deformation reached its maximum value under the primary pressure $P_1$. After the maximum value of the rate of the plastic deformation was observed, the secondary pressure $P_2$ of 250 kgf/cm² per unit sectional area of the mold cavity was applied to the billet 1 instead of the primary pressure $P_1$, and then the secondary current $I_2$ of 800 A was allowed to pass through the billet 1 for 20 seconds to mold it in a specific shape. The resulting rare earth element-iron-boron magnet was cooled for 120 seconds, and released from the mold cavity. The rare earth element-iron magnet had an outer diameter of 19.990–20.000 mm, and a length of $6.74 \pm 0.015$ mm with excellent dimensional precision.

Figure 3:
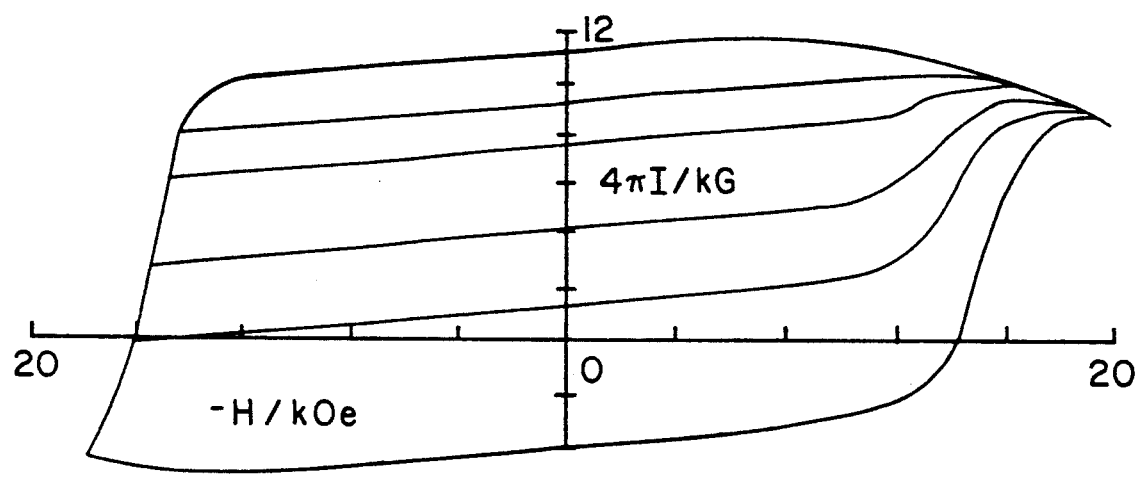
FIG. 3 is a graph showing recoil curves of the magnet produced in the present invention.

FIG. 3 shows the recoil curves of the magnets mentioned above. As can be seen from FIG. 3, this magnet is a pinning-type magnet of which the movement of its magnetic domain wall is pinned. The rare earth element-iron-boron magnet has a residual induction of 11.5 kG, intrinsic coercivity of 15 kOe, and maximum energy product of 31 MGOe. The recoil curves refer to 4 πI-H curves of a magnet obtained when a magnetic field is reversed from the opposing field.

EXAMPLE 2

The procedure of Example 1 was repeated except that the typical production conditions of the rare earth element-iron-boron magnet were changed. The following illustrates the relationship between these production conditions and the magnetic properties of the resulting magnet.

Effect of the primary current value

Figure 4:
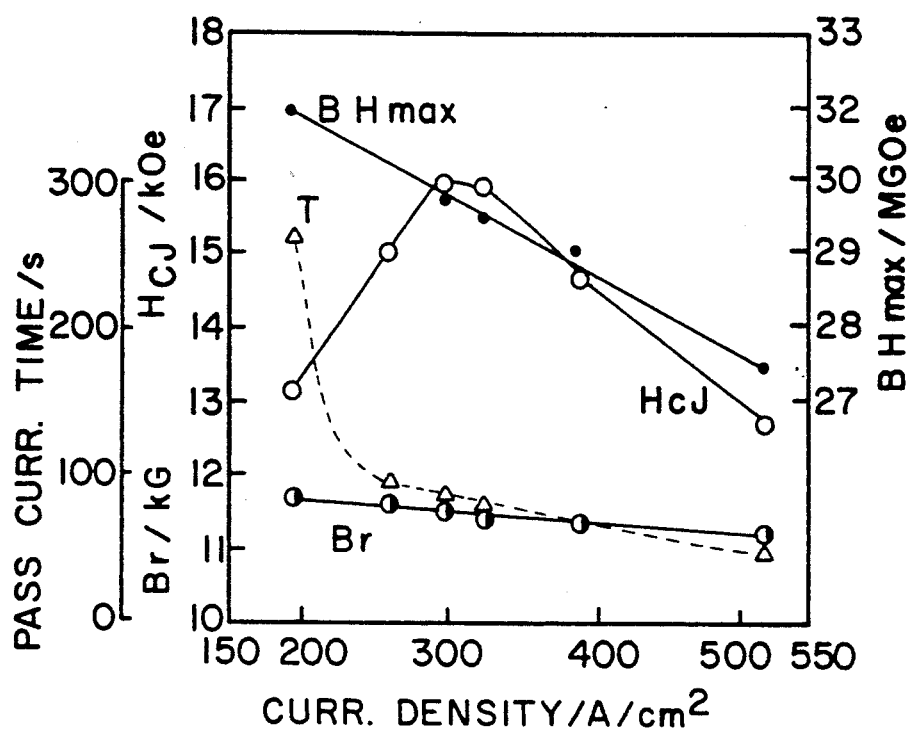
FIG. 4 is a graph showing the relationship between the primary current value and the current time, and the magnetic properties of the resulting magnet, i.e., the intrinsic coercivity, the residual induction and the maximum energy product.

FIG. 4 shows the relationship between the primary current value and the current time, and the magnetic properties of the resulting magnet, i.e., the intrinsic coercivity $H_{CJ}$, the residual induction $B_r$, and the maximum energy product $BH_{max}$. When the primary current value is 250 A/cm² or less per unit sectional area of the billet, a long period of time T is required for plastic deformation because of less amount of Joule's heat generated, and as a result the intrinsic coercivity $H_{CJ}$ of the magnet is decreased. On the other hand, when the primary current is 400 A/cm² or more per unit sectional area of the billet, more Joule heat is generated than that which is leaked by contact of the billet and the mold at the crystallization temperature or higher, resulting in the reduction of the intrinsic coercivity $H_{CJ}$ of the magnet.

Effect of the ratio of specific electric resistance to volume specific heat

Figure 5:
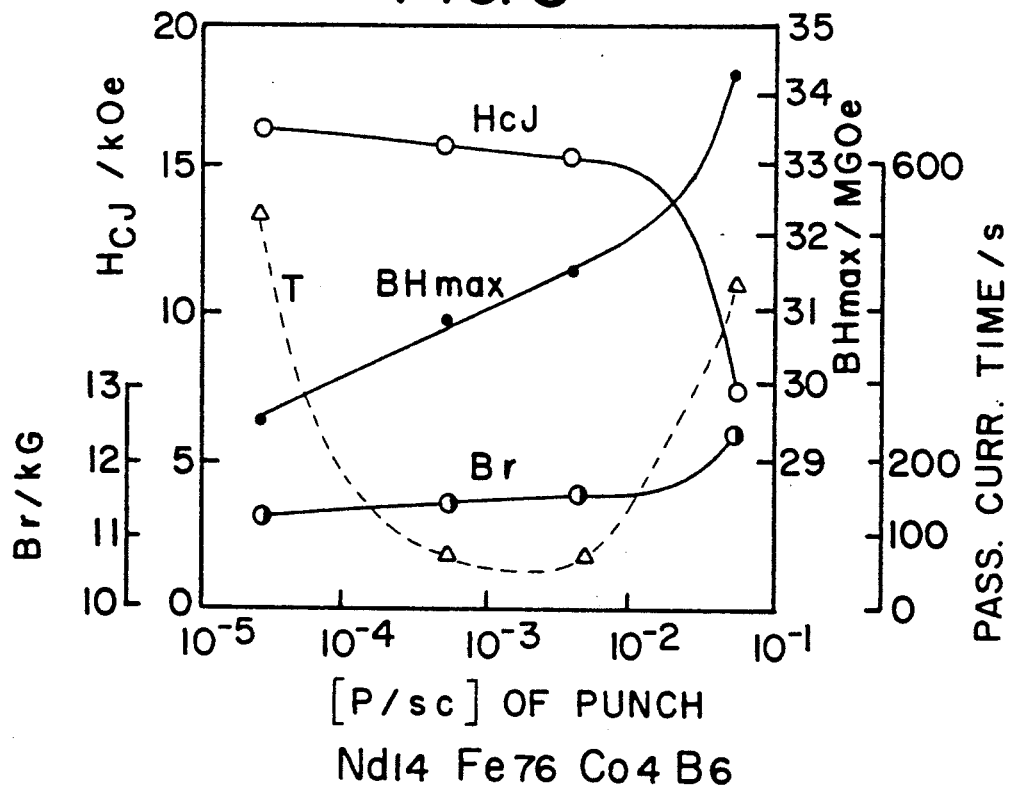
FIG. 5 is a graph showing the relationship between the ratio of specific electric resistance to volume specific heat and the current time, and the magnetic properties of the resulting magnet, i.e., the intrinsic coercivity, the residual induction and the maximum energy product.

FIG. 5 shows the relationship between the ratio of specific electric resistance to volume specific heat and the current time, and the magnetic properties of the resulting magnet, i.e., the intrinsic coercivity $H_{CJ}$, the residual induction $B_r$, and the maximum energy product $BH_{max}$. If the ratio of specific electric resistance to volume specific heat is $10^{-4}$ or less, the current time T is several hundred seconds, therefore the recoil curve becomes less angular. As a result, the maximum energy product $BH_{max}$ of the magnet will be decreased. On the other hand, if the ratio of specific electric resistance to volume specific heat is more than $10^{-2}$, the desirable primary current level cannot be attained by applying only a low voltage, so a long period of time T is required for heating the billet to the crystallization temperature. Also, the temperature of the billet is increased rapidly at the crystallization temperature or higher due to the larger amount of Joule's heat generated than that which is leaked by contact of the billet and the mold, resulting in the reduction of the intrinsic coercivity $H_{CJ}$ of the magnet. As can be seen from the aforementioned description, it is necessary to adjust the ratio of specific electric resistance to volume specific heat to the range of $10^{-4}$ to $10^{-2}$.

Figure 6:
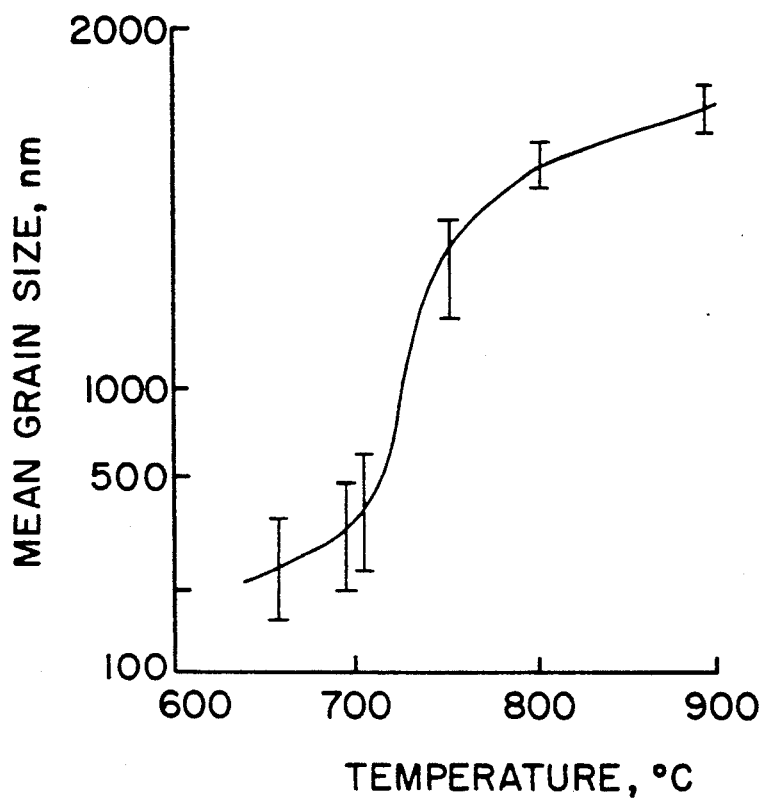
FIG. 6 is a graph showing the relationship between the maximum temperature of the billet and the mean grain size of the crystals of the magnet.
Figure 7:
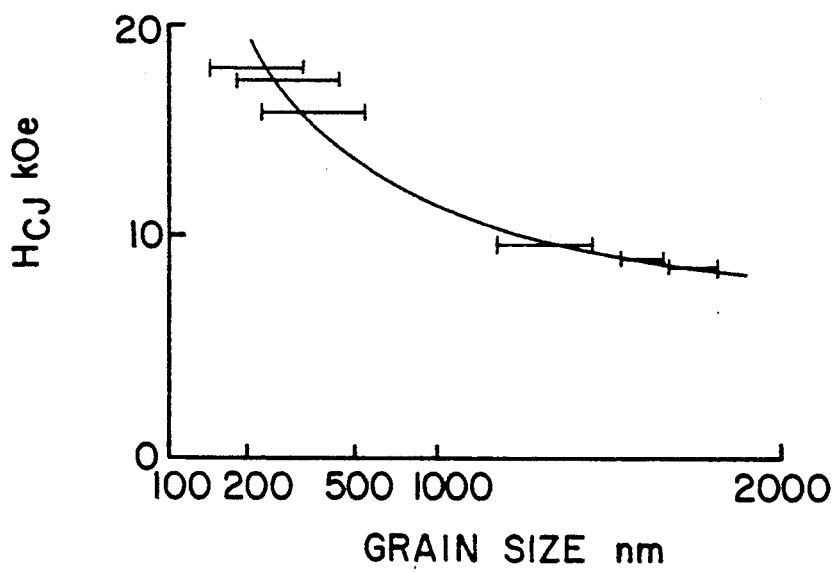
FIG. 7 is a graph showing the relationship between the mean grain size of the crystals of the magnet and its intrinsic coercivity.

FIG. 6 shows the relationship between the maximum temperature of the billet and the mean grain size of the crystals of the magnet. Also, FIG. 7 shows the relationship between the mean grain size of the crystals of the magnet and its intrinsic coercivity $H_{CJ}$. As can be seen from both figures, when the maximum temperature of the billet is more than 750° C., rapid growth of the grain size of the crystals occurs, so that the intrinsic coercivity $H_{CJ}$ of the magnet will be decreased.

The maximum temperature of the billet in this invention depends on the ratio of specific electric resistance to volume specific heat, the ratio of the heat capacity of the electrodes at the side of the billet to that of the electrodes at the other side, and the current density. It is necessary to maintain the temperature of the billet between the crystallization temperature and 750° C. for at least ten to one hundred seconds.

Effect of the primary pressure

Figure 8:
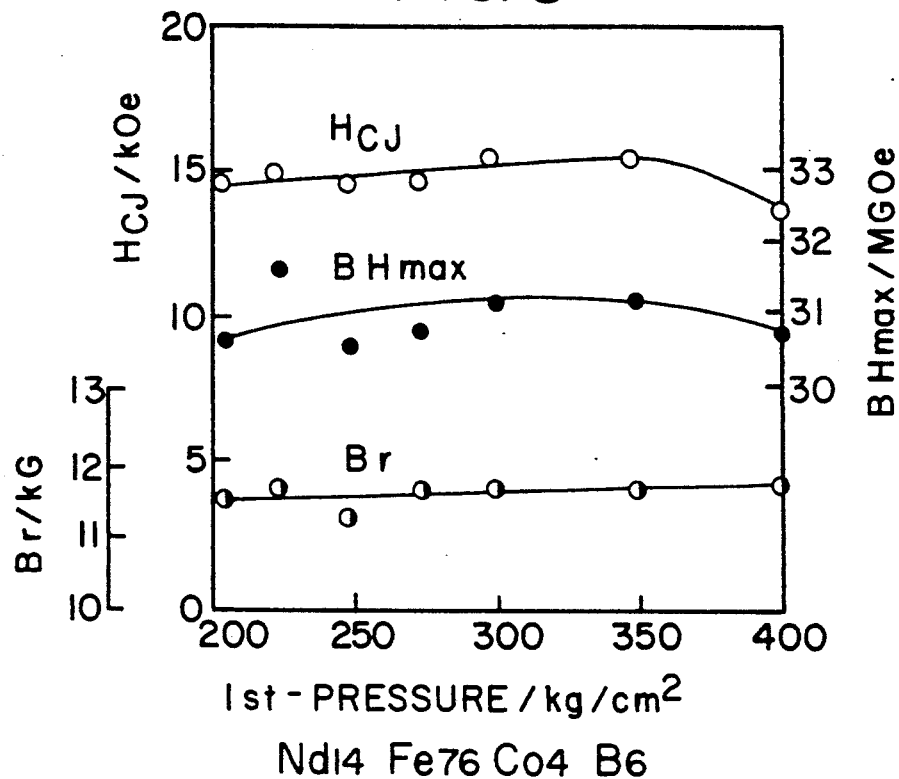
FIG. 8 is a graph showing the relationship between the primary pressure and the magnetic properties of the resulting magnet, i.e., the intrinsic coercivity, the residual induction and the maximum energy product.

FIG. 8 shows the relationship between the primary pressure per unit sectional area of the billet and the magnetic properties of the resulting magnet, i.e., the intrinsic coercivity $H_{CJ}$, the residual induction $B_r$, and the maximum energy product $BH_{max}$. The primary pressure has almost no effect on the magnetic properties. However, it is preferred that the plastic deformation of the billet is conducted under a low pressure of 200 kgf/cm² per unit sectional area of the billet because of practical reasons such as the durability of the mold.

Effect of the secondary pressure

Figure 9:
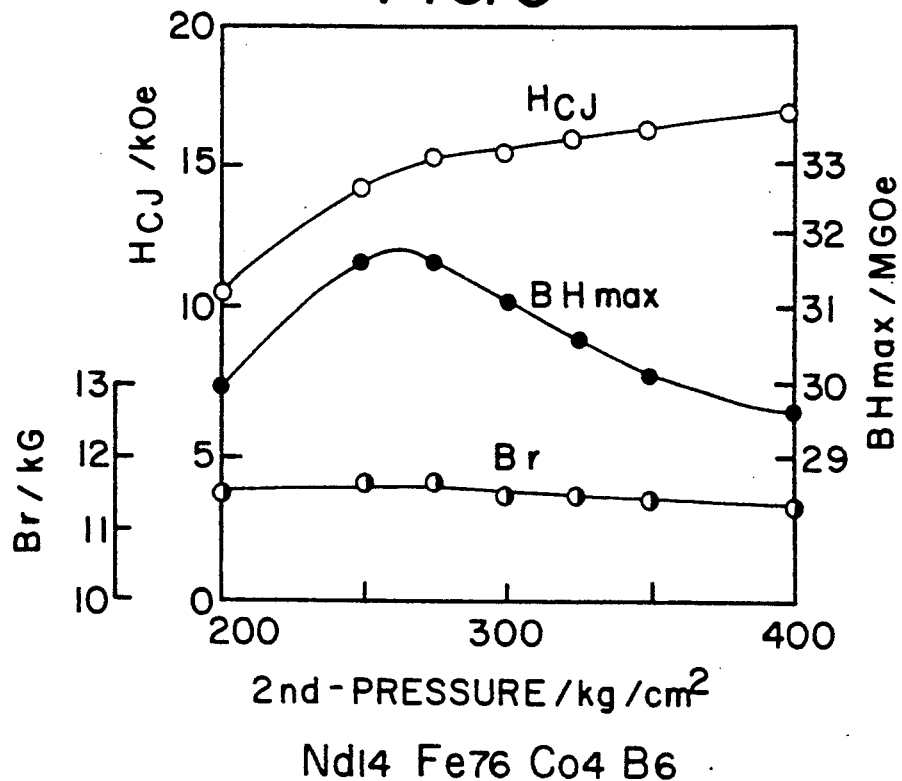
FIG. 9 is a graph showing the relationship between the secondary pressure and the magnetic properties of the resulting magnet, i.e., the intrinsic coercivity, the residual induction and the maximum energy product.

FIG. 9 shows the relationship between the secondary pressure per unit sectional area of the mold cavity and the magnetic properties of the resulting magnet, i.e., the intrinsic coercivity $H_{CJ}$, the residual induction $B_r$, and the maximum energy product $BH_{max}$. Preferably, the primary pressure is replaced by the secondary pressure in such a range that the plastic deformation rate of the billet is between its peak level and $10^{-4}$ mm/s, so the effect of the secondary pressure on the magnetic properties of the resulting magnet will be negligible.

The secondary pressure level has an effect on the intrinsic coercivity $H_{CJ}$, the residual induction $B_r$, and the maximum energy product $BH_{max}$ of the magnet. If the secondary pressure is 200 kgf/cm² or less, the intrinsic coercivity $H_{CJ}$ will be at a low level. On the other hand, if the secondary pressure is 400 kgf/cm² or more, the maximum energy product $BH_{max}$ will become low because residual induction is lowered and the recoil curve becomes less angular. Therefore, the secondary pressure is usually 200-400 kgf/cm², preferably 250-300 kgf/cm². Additionally, it is desirable that the primary pressure be about the value of $(0.2-1.0) \times P_2$ (i.e., the secondary pressure) to ensure a stable electrical connection between the billet and the electrodes.

Effect of the degree of vacuum

Figure 10:
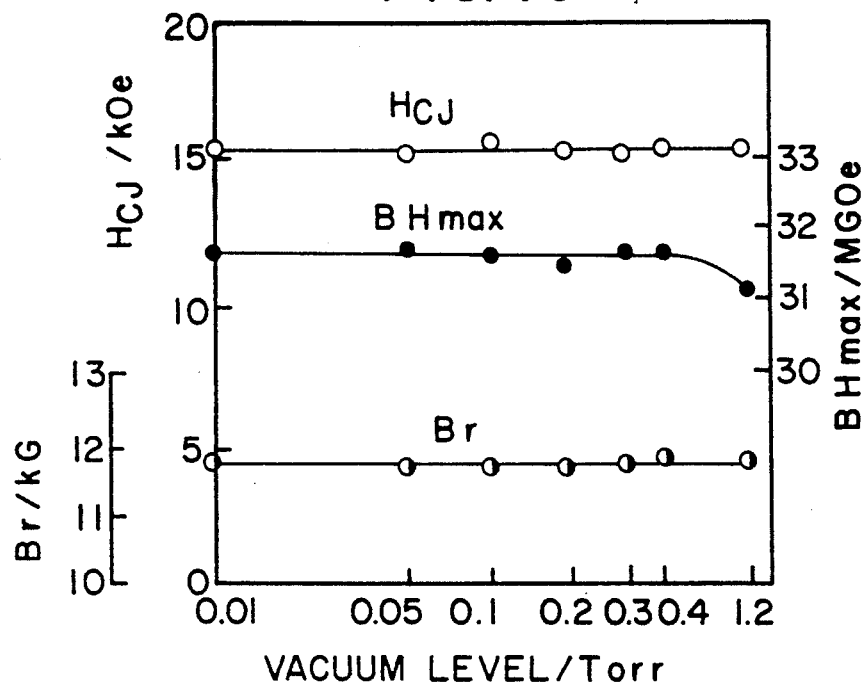
FIG. 10 is a graph showing the relationship between the degree of vacuum and the magnetic properties of the resulting magnet, i.e., the intrinsic coercivity, the residual induction and the maximum energy product.

FIG. 10 shows the relationship between the degree of vacuum and the magnetic properties of the resulting magnet, i.e., the intrinsic coercivity, the residual induction $B_r$, and the maximum energy product $BH_{max}$. When the degree of vacuum is in the range of 1.2 to $10^{-2}$ Torr, it has no effect on the magnetic properties of the magnet. Even when the plastic deformation is conducted under atmospheric pressure, the magnetic properties such as intrinsic coercivity $H_{CJ}$ of the magnet are not damaged, significantly. However, in order to ensure the durability of the mold to oxidation, it is advantageous to use the degree of vacuum of about 1.2 to $10^{-2}$ Torr.

EXAMPLE 3

Figure 11:
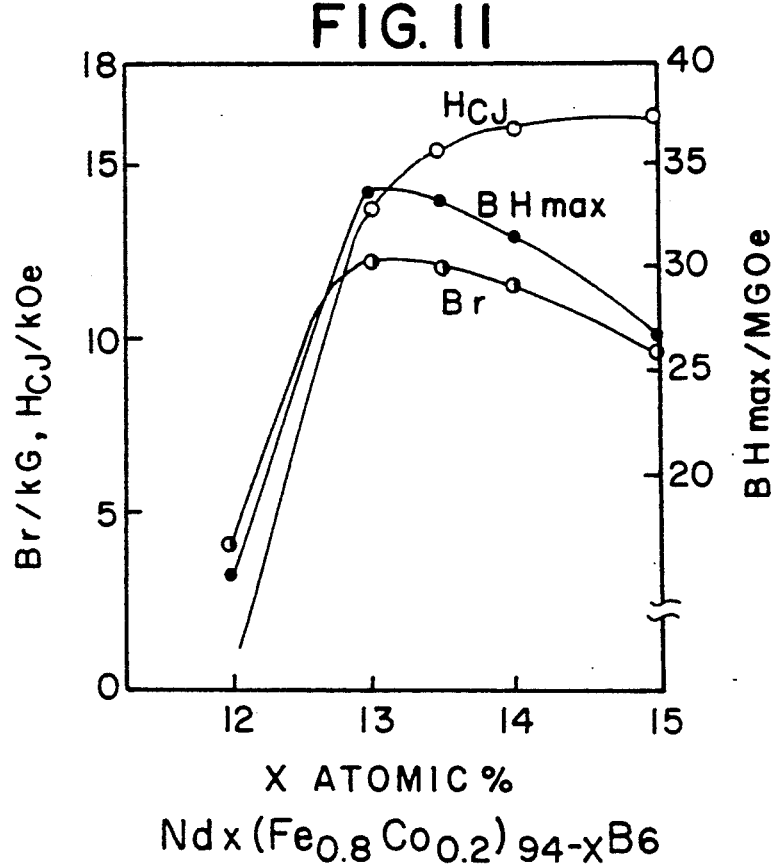
FIG. 11 is a graph showing the relationship between the amount of neodymium and the magnetic properties of the resulting magnet, i.e., the intrinsic coercivity, the residual induction and the maximum energy product.

The procedure of Example 1 was repeated except that the amount of neodymium(Nd) was changed. FIG. 11 shows the relationship between the amount of neodymium and the magnetic properties of the resulting magnet, i.e., the intrinsic coercivity $H_{CJ}$, the residual magnetization $B_r$, and the maximum energy product $BH_{max}$. If the amount of neodymium is less than 12 atomic percent, it is difficult to subject the rare earth element-iron-boron rapid solidification powder to plastic deformation in the range of the crystallization temperature to 750° C. In order to conduct the plastic deformation, the rapid solidification powder must be heated to an elevated temperature of 750° C. or more, so that the fine crystals of the rapid solidification powder become larger, which may cause the reduction of its intrinsic coercivity $H_{CJ}$, and residual induction $B_r$. Also, the resulting magnet, because it is mechanically fragile, is not suitable for practical use. On the other hand, if the amount of neodymium is more than 15 atomic percent, a large scale of flash is formed in the space between the mold cavity and the electrodes because the neodymium is oozed into the space, causing the reduction of release of the magnet. It also causes the reduction of residual induction of the magnet due to the decrease of the saturation magnetization. Therefore, it is preferred that the amount of neodymium is adjusted to the range of 12 to 15 atomic percent.

Example 4

The procedure of Example 1 was repeated except that the grain size of the flake rapid solidification powder, the relative density of the billet, and the ratio f the sectional are S of the cavity to the sectional are $S_o$ of the billet were changed.

Figure 12:
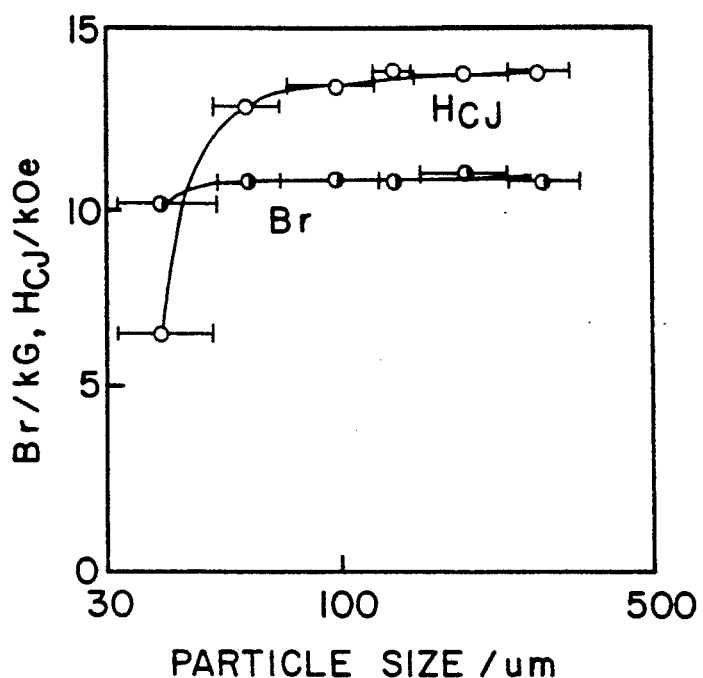
FIG. 12 is a graph showing the relationship between the particle size of the rapid solidification powder and the magnetic properties of the resulting magnet, i.e., the intrinsic coercivity, and the residual induction.

FIG. 12 shows the relationship between the grain size of the flake rapid solidification powder and the magnetic properties of the resulting magnet, i.e., the intrinsic coercivity $H_{CJ}$, the residual induction $B_r$, and the maximum energy product $BH_{max}$. If the grain size of the rapid solidification powder is less than 53 μm, the intrinsic coercivity $H_{CJ}$ of the magnet will be decreased. Therefore, it is preferred that the rapid solidification powder flake does not contain any fine powder which has a grain size of less than 53 μm.

Figure 13:
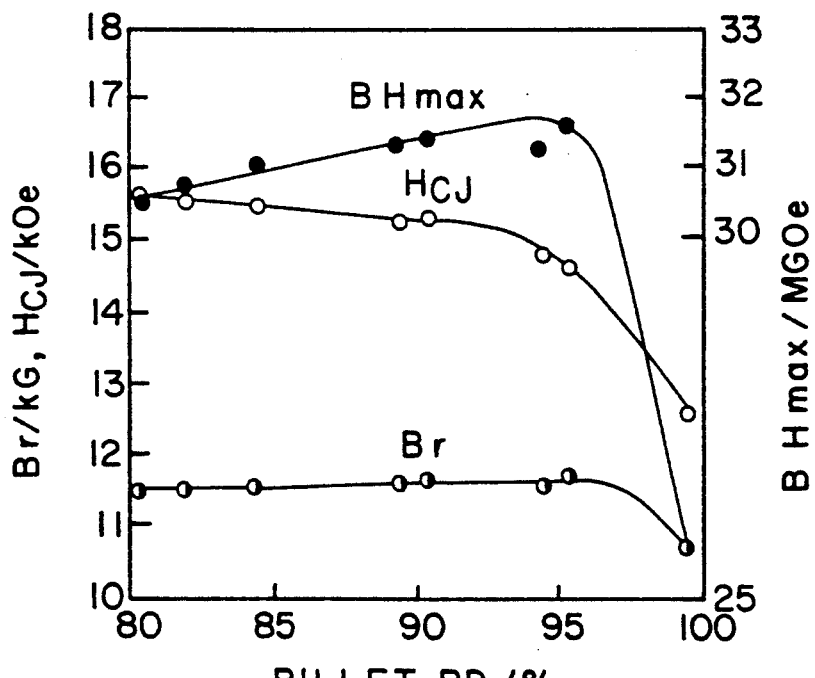
FIG. 13 is a graph showing the relationship between the relative density of the billet and the magnetic properties of the resulting magnet, i.e., the intrinsic coercivity, the residual induction and the maximum energy product.

FIG. 13 shows the relationship between the relative density of the billet and the magnetic properties of the resulting magnet, i.e., the intrinsic coercivity $H_{CJ}$, the residual induction $B_r$, and the maximum energy product $BH_{max}$. If the relative density is more than 95%, the intrinsic coercivity $H_{CJ}$, the residual induction $B_r$, and the maximum energy product $BH_{max}$ of the magnet will be reduced. Therefore, it is preferred that the relative density of the rapid solidification powder is 95% or less. However, if the relative density of the rapid solidification powder is 80% or less, the billet may buckle because of the reduction of the compressive strength of the billet.

Figure 14:
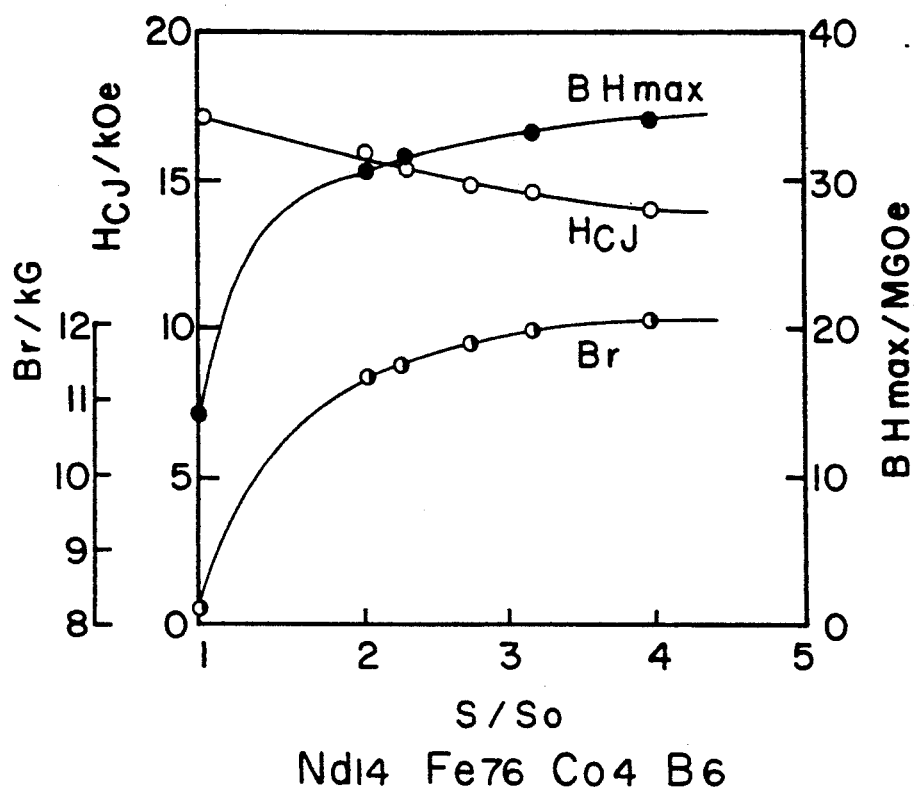
FIG. 14 is a graph showing the relationship between the ratio of the sectional area S of the cavity to the sectional area $S_o$ of the billet and the magnetic properties of the resulting magnet, i.e., the intrinsic coercivity, the residual induction and the maximum energy product.

FIG. 14 shows the relationship between the ratio of the sectional are S of the cavity to the sectional are $S_o$ of the billet and the magnetic properties of the resulting magnet, i.e., the intrinsic coercivity $H_{CJ}$, the residual induction $B_r$, and the maximum energy product $BH_{max}$. If the ratio, $S/S_o$ is 2 or less, the magnet does not have sufficient magnetic anisotropy because of its low residual induction. However, if the ratio $S/S_o$ is 2 to 3, the rare earth element-iron-boron magnet having the residual induction $B_r$ of about 11 kG can be obtained.

Example 5

The procedure of Example 1 was repeated except that the secondary current value was changed. Various rare earth element-iron-boron magnets having different intrinsic coercivity values can be obtained as shown in Table 1.

TABLE 1

| Sample No. | Comparative Examples | | | | Examples | | | | |
|---|---|---|---|---|---|---|---|---|---|
| | 1 | 2 | 3 | 4 | 5 | 6 | 7 | 8 | 9 |
| Secondary Current (kA) | 1 | 1 | 1 | 0.9 | 1 | 0.9 | 0.8 | 0.9 | 0.8 |
| Current Time (sec) | 20 | 13 | 11 | 20 | 6 | 13 | 25 | 6 | 20 |
| Intrinsic Coercivity (kOe) | 8.9 | 12.8 | 13.4 | 13.9 | 14.4 | 14.8 | 15.3 | 15.6 | 16.0 |
| Residual Induction (kG) | 12.1 | 11.7 | 11.6 | 11.7 | 11.6 | 11.9 | 11.4 | 11.4 | 11.6 |
| Maximum Energy Product (MGOe) | 33.4 | 31.5 | 30.4 | 31.8 | 31.1 | 33.3 | 30.2 | 30.1 | 31.0 |

On the other hand, a rare earth element-iron-boron magnet with full density of the aforementioned magnet was produced by charging 16 g of the rapid solidification flake powder of the same rare earth element-iron-boron alloy as described above ($Nd_{14}Fe_{76}Co_4B_6$) into the device shown in FIGS. 1(a) to 1(d) without the formation of the billet, applying the pressure of 300 kgf/cm$^2$ between the electrodes under vacuum atmosphere of $10^{-1}$ to $10^{-3}$ Torr while allowing a current of 0.8-1.5 kA to pass through the flake powder, and holding the current until the strain rate $\Delta h/\Delta t$ reaches $10^{-3}$ mm/s. Table 2 illustrates the magnetic properties of the resulting rare earth element-iron-boron magnet.

TABLE 2

| Sample No. | 1 | 2 | 3 | 4 | 5 |
|---|---|---|---|---|---|
| Intrinsic Coercivity (kOe) | 8.8 | 9.6 | 13.9 | 16.3 | 16.7 |
| Residual Magnetization (kG) | 8.1 | 8.1 | 8.3 | 8.4 | 8.3 |
| Maximum Energy Product (MGOe) | 11.5 | 12.7 | 14.6 | 15.5 | 15.6 |

Several rare earth element-iron-boron magnets produced in this invention were worked into 5 mm (diameter) × 5 mm (length) samples to measure their magnetic properties by a vibrating sample magnetometer (VSM) at a temperature of 20° to 120° C. after a pulse magnetization of 50 kOe. Based on the measured magnetic properties, a temperature coefficient of intrinsic coercivity was determined by a method of least squares.

Figure 15:
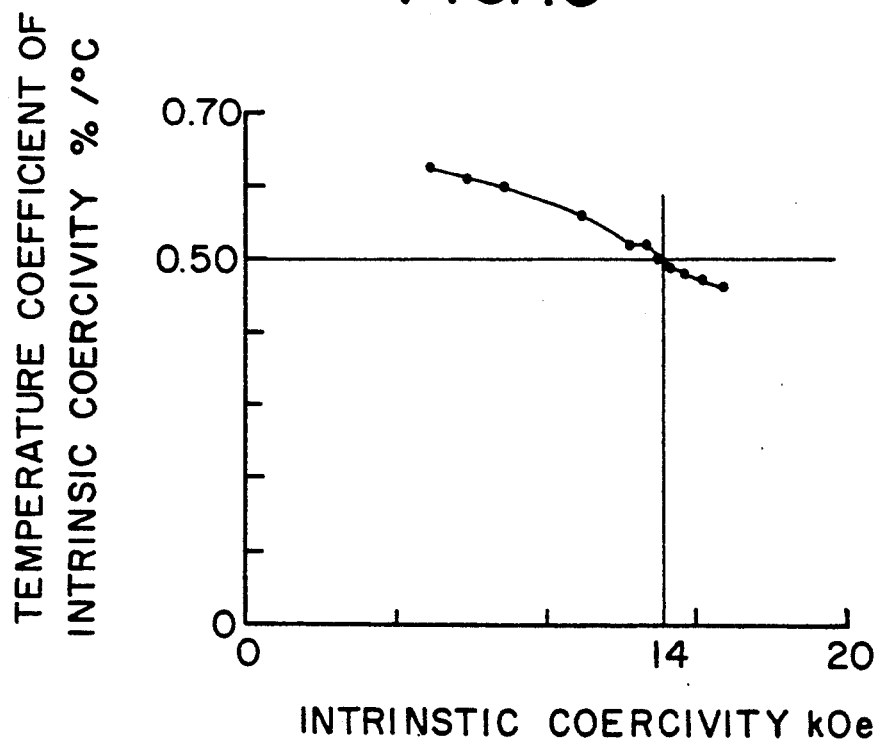
FIG. 15 is a graph showing the relationship between the intrinsic coercivity, and its temperature coefficient.

FIG. 15 shows the relationship between the intrinsic coercivity and its temperature coefficient. As can be seen from this figure, the temperature coefficient of the magnet having an intrinsic coercivity of 14 kOe or more is −0.50%/°C. or less, which is much lower than that of conventional rare earth element-iron rapid solidification magnet or sintered magnet having a composition of $Nd_{13.1}Pr_{0.35}Dy_{1.50}Fe_{78.9}B_{6.2}$, i.e., −0.60%/°C.

The rare earth element-iron-boron magnets having different intrinsic coercivities described above were subjected to a 50 kOe pulse magnetization, heated at a given temperature for 1 hour, and cooled to room temperature. The amount of magnetic flux of the magnets was measured by a search coil before and after the heating procedure, and then the percentage of reduction of magnetic flux was calculated as an irreversible demagnetizing factor.

Figure 16:
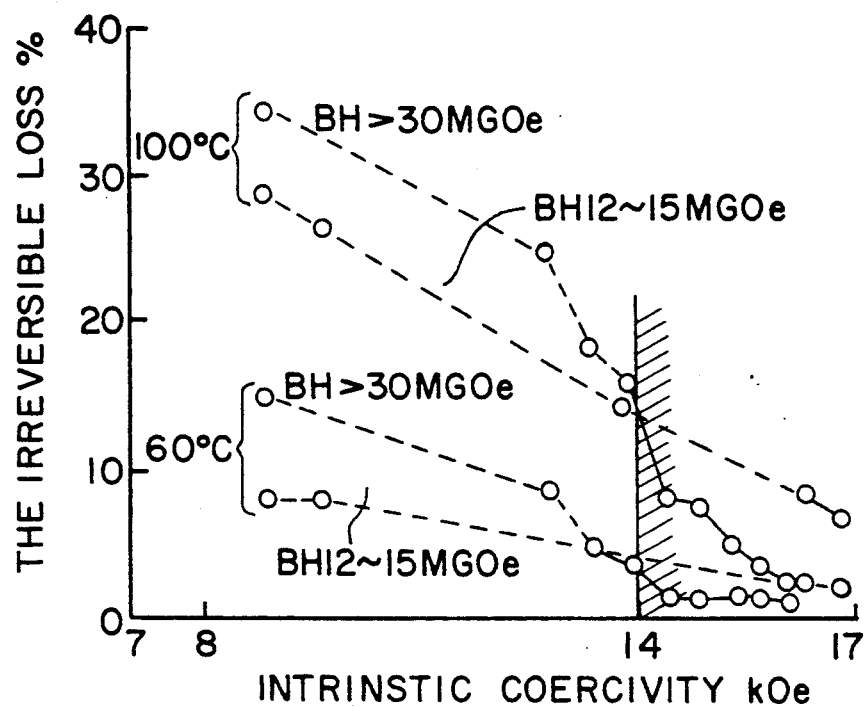
FIG. 16 is a graph showing the relationship between the intrinsic coercivity and the irreversible loss of the rare earth element-iron magnet.

FIG. 16 shows the relationship between the intrinsic coercivity and the irreversible demagnetizing factor of the rare earth element-iron-boron magnets having different intrinsic coercivities. As can be seen from this figure, the rare earth element-iron-boron magnets having an intrinsic coercivity of 14 kOe or more and a maximum energy force of 30 MGOe or more has less irreversible demagnetizing factor in a practical temperature range of 60° to 100° C. than those having the same intrinsic coercivity with a maximum energy product of 12 to 15 MGOe, which indicates that the former have better thermal stability. Also, when the intrinsic coercivity of a rare earth element-iron-boron magnet having a maximum energy product of 30 MGOe reaches 14 kOe or more, its irreversible demagnetizing factor will be reduced, significantly.

Example 6

A ribbon flake was obtained by melting an R-TM-B type alloy and R-TM-B-Ga type alloy in an induction heating furnace, and rapid solidification by a melt spinning technique under Ar atmosphere. It was identified from an X-ray diffraction that the ribbon flake was a mixture of crystalline structure and amorphous structures having an indeterminate shape with about 30 μm thickness. The ribbon flake was ground to a grain size of 53–350 μm, sieved, and charged into a mold cavity in an amount of 2.30 g. Then, a billet was formed by heating the ribbon flake while allowing a current to pass through it under a vacuum atmosphere of $10^{-1}$ to $10^{-3}$ Torr. The billet had a ring shape with an outer diameter of 18.5 mm, inner diameter of 13.5 mm, and a relative density of 80-90%.

Then, the billet mentioned above was placed in the plastic deformation molding cavity shown in FIG. 1, which was comprised of a pair of cylindrical electrode parts 2a and 2a' with an outer diameter of 22 mm, inner diameter of 10 mm, and length of 5 mm at the side of the billet, a pair of cylindrical electrode parts 2b and 2b' with an outer diameter of 22 mm, inner diameter of 10 mm, and length of 20 mm at the other side, and an electrically non-conductive die 3 with an inner diameter of 22.05 mm and length of 40 mm. The electrode parts 2a and 2a' were made from TiN/SIALON composite ceramics having a ratio of specific electric resistance to volume specific heat ($\rho$) of $4 \times 10^{-4}$ Ωcm while the electrode parts 2b and 2b' were made from graphite having a ratio of specific electric resistance to volume specific heat ($\rho$) of $1.6 \times 10^{-3}$ Ωcm. On the top surface of the electrode parts 2a and 2a', a film of a mixture including boron nitride(BN) and an organic polymer was formed. The electrically non-conductive die 3 was made from SIALON. Also, cores made form SUS304 were inserted into the hollow parts of the billet and the electrodes, which have outer diameters of 9.95 mm.

First, the deformation device was evacuated to a vacuum atmosphere of $10^{-1}$ to $10^{-3}$ Torr. Then, the composite film was subjected to dielectric breakdown by discharging it between the electrodes 2 and 2' over 15 seconds while applying a uniaxial pressure to the billet 1 through the electrodes 2 and 2' to ensure the electric conductivity between the electrodes 2 and 2'. The discharging current between the electrodes 2 and 2' was less than several mA, so the temperature increase derived from Joule's heat generated from the current was hardly observed in the billet 1.

Then, a primary pressure $P_1$ of 125 kgf/cm² per unit sectional are of the electrode was applied to the billet 1 through the electrodes 2 and 2' while allowing a primary current $I_1$ of 160 A/cm² per unit sectional area of the electrode to pass through the billet 1, thereby heating the electrodes 2 and 2', billet 1, die 3, and cores by Joule's heat generated from the primary current. The temperature of the billet 1 was increased such rapidly than that of the die 3. Only in about 20 seconds after applying the primary current $I_1$, the billet 1 was subjected to plastic deformation, and about 40 seconds later, the rate of the plastic deformation reached its maximum value under the primary pressure $P_1$. After the maximum rate of the plastic deformation was observed, the primary pressure $P_1$ was replaced by the secondary pressure $P_2$ of 250 kgf/cm² per unit sectional area of the electrode applied to the billet 1, and then the secondary current $I_2$ of 300 A/cm² per unit sectional area of the electrode was allowed to pass through the billet 1 for 20 seconds to form a rare earth element-iron-boron magnet with a specific shape. The resulting rare earth element-iron-boron magnet was cooled for 120 seconds, and released out of the mold cavity. The hollow-flat rare earth element-iron-boron magnet had an outer diameter of 22.05 mm, an inner diameter of 10.02 mm and a length of 0,1.0±0.02 mm with excellent dimensional precision.

Table 3 illustrates the magnetic properties of hollow-flat rare earth element-iron-boron magnets, which are for example obtained from a billet of a mixture of an R-TM-B type alloy (I: $Nd_{14}Fe_{76}Co_4B_6$) and R-TM-B-Ga type alloy (II: $Nd_{13.5}Fe_{61.5}Co_{18}B_6Ga_1$), and the like.

TABLE 3

| Composition | Examples | | | | | | Comparative Examples | | | | | |
|---|---|---|---|---|---|---|---|---|---|---|---|---|
| | I/II | I/II | I/II | I/II | III/II | I | III | II | I/IV | IV | V | I/VI |
| Weight ratio | 95/5 | 90/10 | 80/20 | 70/30 | 80/20 | 100 | 100 | 100 | 80/20 | 100 | 100 | 80/20 |
| Intrinsic coercivity (kOe) | 13.8 | 14.5 | 15.9 | 16.4 | 16.4 | X | X | 19.0 | 14.0 | 16.8 | 20.5 | X |
| Residual magnetic induction (kG) | 12.2 | 11.6 | 11.7 | 11.4 | 11.8 | X | X | 10.8 | 10.8 | 10.2 | 10.3 | X |
| Maximum energy product (MGOe) | 33.4 | 31.9 | 32.0 | 30.1 | 32.3 | X | X | 26.7 | 26.4 | 24.0 | 24.3 | X |

I: $Nd_{14}Fe_{76}Co_4B_6$,
II: $Nd_{13.5}Fe_{61.5}Co_{18}B_6Ga_1$,
III: $Nd_{14}Fe_{80}B_6$,
IV: $Nd_{16}Fe_{60}Co_{18}B_6$,
V: $Nd_{16}Fe_{74}Co_{18}B_6Ga_1$,
VI: $Nd_{13.5}Fe_{62.5}Co_{18}B_6$
X: Generation of cracks As described in Table 3, when a billet of either $Nd_{14}Fe_{76}Co_4B_6$(I) or $Nd_{14}Fe_{80}B_6$(III) rapid solidification powder was subject to plastic deformation for providing it with magnetic anisotropy under pressure by heating with Joule's heat generated from a current to form a hollow-flat magnet with about 1 mm thickness, radial cracks occurred on the magnet. On the other hand, when the amount of neodymium(Nd) is increased to 16 atomic %, a magnet with a specific shape can easily be formed due to less resistance to plastic deformation, but high residual induction cannot be obtained in the magnet because of the reduction of saturation magnetization. By using a billet of a mixture of an R-TM-B type alloy and R-TM-B-Ga type alloy, a magnet with a high residual induction of 11 kG or more can be produced in a specific shape. The resulting magnet has also a high intrinsic coercivity of 14 kOe or more, which ensures excellent thermal stability of magnetic properties.

Figure 17:
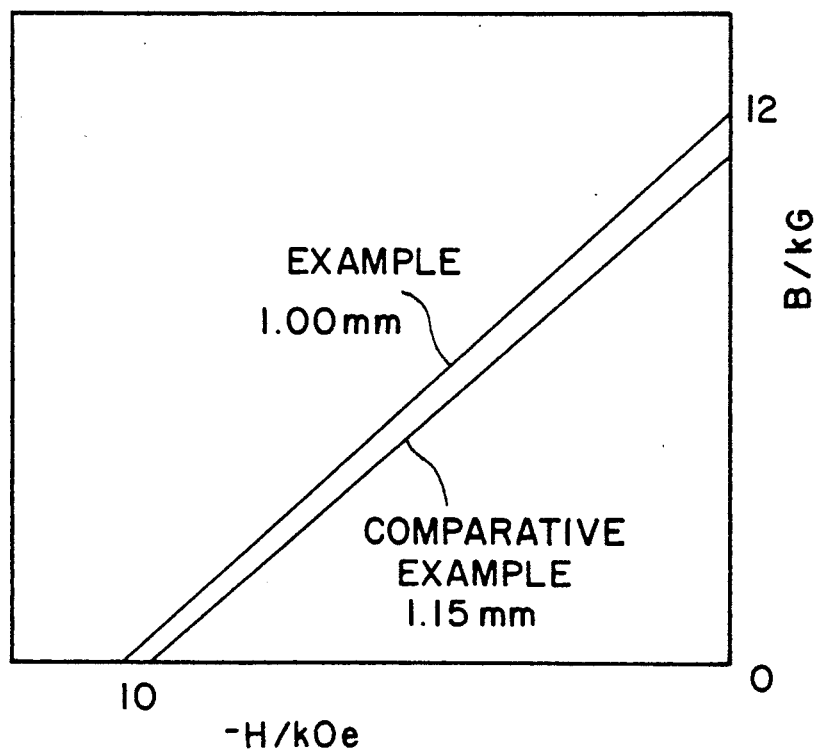
FIG. 17 is a graph showing the relationship between the intensity of magnetic field and the magnetic induction of the laminated rare earth element-iron-boron rapid solidification magnet, compared to the rare earth element-iron-boron sintered magnet.

FIG. 17 shows the relationship between the intrinsic coercivity and the residual induction of hollow-flat rare earth element-iron-boron rapid solidification magnets with an outer diameter of 22 mm, inner diameter of 10 mm, and thickness of 1 mm or 4 mm, when compared to the rare earth element-iron-boron sintered magnets with the same outer and inner diameters, and thickness of 1.15 mm or 4 mm which were produced by a powder metallurgy method. Also, Table 4 illustrates the intrinsic coercivity and residual induction of these two types of laminated magnets. The rare earth element-iron-boron rapid solidification magnets (this invention) are comprised of a mixture of an R-TM-B type alloy (I: $Nd_{14}Fe_{76}Co_4B_6$) and R-TM-B-Ga type alloy (II: $Nd_{13.5}Fe_{61.5}Co_{18}B_6Ga_1$) (weight ratio: 0.8/0.2) while the rare earth element-iron-boron sintered magnets are comprised of an alloy of $Nd_{13.1}Pr_{0.35}Dy_{1.50}Fe_{78.9}B_{6.2}$.

TABLE 4

| | Thickness mm | Residual magnetization kG | Intrinsic coercivity kOe | Maximum energy product MGOe |
|---|---|---|---|---|
| Rare earth element-iron-boron rapid solidification magnet (this invention) | 1.00 | 11.7 | 10.35 | 32 |
| | 4.00 | 11.8 | 10.28 | 32 |
| Rare earth element-iron-boron sintered magnet (Comparative Example) | 1.15 | 10.7 | 9.68 | 27 |
| | 4.00 | 11.2–11.6 | 10.6–11.1 | 30–32 |

As can be seen from FIG. 17 and Table 4, because the rare earth element-iron-boron rapid solidification magnet is subjected to magnetic anisotropy by a plastic deformation technique, even when a thinner magnet with about 1 mm thickness is formed, the orientation of the magnet is relatively less disturbed in the direction of thickness. This is because the direction of the pressure applied to the magnet is identical to the axis of easy magnetization. On the other hand, because the direction of the applied magnetic field is identical to the direction of pressure in the rare earth element-iron-boron sintered magnet, when a thinner magnet is produced, the orientation of the magnet is much more disturbed, which causes the reduction of residual induction.

It is understood that various other modifications will be apparent to and can be readily made by those skilled in the art without departing from the scope and spirit of this invention. Accordingly, it is not intended that the scope of the claims appended hereto be limited to the description as set froth herein, but rather that the claims be construed as encompassing all the features of patentable novelty that reside in the present invention, including all features that would be treated as equivalents thereof by those skilled in the art to which this invention pertains.

What is claimed is:

1. A process for producing a rare earth element-iron-boron anisotropic magnet comprising the steps of:
   a) placing a billet produced of rapid solidification powder of a rare earth element-iron-boron alloy into a mold cavity,
   b) applying a primary pressure to said billet in said mold cavity, while allowing a primary current to pass through said billet,
   c) applying to said billet a secondary pressure which is increased up to at least five times as much as the primary pressure, and
   d) applying a secondary current greater than the primary current previously passed through said billet,
   e) wherein the billet is subjected to plastic deformation at the temperature between the crystalline temperature and 750° C.

2. A process for producing a rare earth element-iron-boron anisotropic magnet of claim 1, wherein said mold cavity is formed between a pair of electrodes which are located inside an electrically non-conductive die, wherein said electrodes have a ratio of specific electric resistance to volume specific heat in the range of $10^{-4}$ to $10^{-2}$ in which said volume specific heat is defined by a product of specific gravity and specific heat.

3. A process for producing a rare earth element-iron-boron anisotropic magnet of claim 2, wherein a film of a mixture including boron nitride(BN) and an organic polymer is formed on the top surface of said electrodes to be contacted with said billet, and at least one part of said film is subjected to dielectric breakdown by discharging said film and applying said primary current.

4. A process for producing a rare earth element-iron-boron anisotropic magnet of claim 2, wherein each of said electrodes is comprised of an electrically conductive portion and a graphite portion.

5. A process for producing a rare earth element-iron-boron anisotropic magnet of claim 2, wherein the billet side of said electrode, and said non-conductive die are made from a material containing SIALON ($Si_{6-z}Al_zO_zN_{6-z}$; z is 1–4.60).

6. A process for producing a rare earth element-iron-boron anisotropic magnet of claim 1, wherein said rapid solidification powder is a flake powder having an $R_2TM_{14}B$ phase, wherein R is at least either neodymium(Nd) or praseodymium(Pr), TM is at least either iron(Fe) or cobalt(Co), and B is boron, as a major phase with the mean rain size of 500 nm or less, and said rare earth element-iron-boron alloy contains 13 to 15 atomic percent of at least either neodymium(Nd) or praseodymium(Pr), 5 to 7 atomic percent of boron(B), and the balance of at least either iron(Fe) or cobalt(Co).

7. A process for producing a rare earth element-iron-boron anisotropic magnet of claim 1, wherein said billet is formed by mixing an R-TM-B alloy, wherein R is at least either neodymium(Nd) or praseodymium(Pr), TM is at least either iron(Fe) or cobalt(Co), B is boron, with an R-TM-B-Ga alloy, wherein R is at least either neodymium(Nd) or praseodymium(Pr), TM is at least either iron(Fe) or cobalt(Co), B is boron, and Ga is gallium, and then solidifying the mixture.

8. A process for producing a rare earth element-iron-boron anisotropic magnet of claim 1, wherein said billet is formed by solidifying said flake rapid solidification powder with a diameter of 53 μm or more.

9. A process for producing a rare earth element-iron-boron anisotropic magnet of claim 1, said billet has a relative density of 95% or less.

10. A process for producing a rare earth element-iron-boron anisotropic magnet of claim 1, wherein the ratio of the sectional area S or said cavity to the sectional are $S_o$ of said billet is 2 to 3 in which both sectional areas are located at the right angle of said pressure.

* * * * *

UNITED STATES PATENT AND TRADEMARK OFFICE
CERTIFICATE OF CORRECTION

PATENT NO. : 5,178,691                                      Page 1 of 7

DATED : January 12, 1993

INVENTOR(S) : Fumitoshi Yamashita and Masami Wada

It is certified that error appears in the above-indentified patent and that said Letters Patent is hereby corrected as shown below:

On the Cover Page:

Please amend the title to

-- PROCESS FOR PRODUCING A RARE EARTH ELEMENT-IRON-BORON ANISOTROPIC MAGNET --

In the Drawings:
Please replace Sheet 2 of 10, Figure 2, to correct spelling of "DISTORTION".

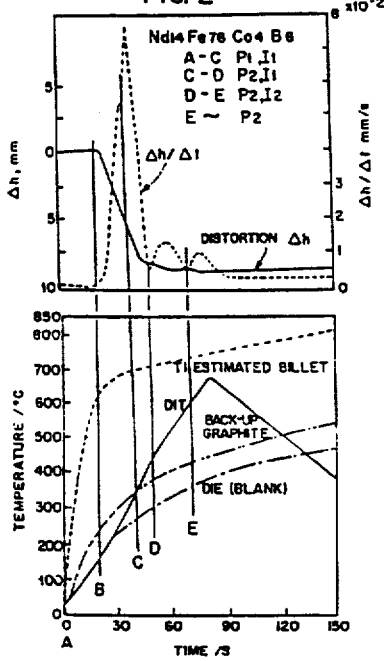

UNITED STATES PATENT AND TRADEMARK OFFICE
CERTIFICATE OF CORRECTION

PATENT NO. : 5,178,691
DATED : January 12, 1993
INVENTOR(S) : Fumitoshi Yamashita and Masami Wada It is certified that error appears in the above-indentified patent and that said Letters Patent is hereby corrected as shown below:

Please replace Sheet 9 of 10, Figures 14 and 15, correct spelling of "INTRINSIC" on Fig. 15.

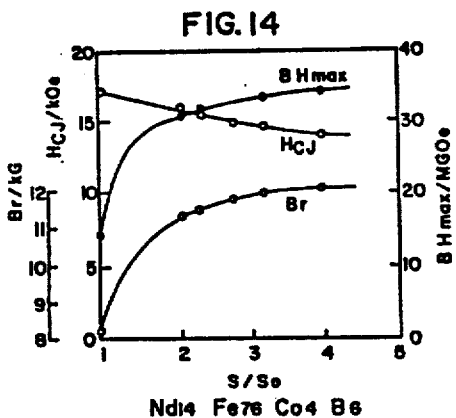

FIG. 14

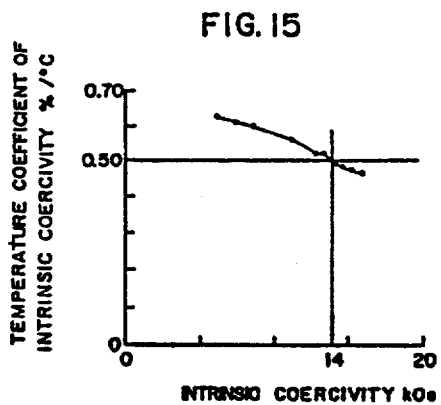

FIG. 15

UNITED STATES PATENT AND TRADEMARK OFFICE
CERTIFICATE OF CORRECTION

PATENT NO. : 5,178,691

DATED : January 12, 1993

INVENTOR(S) : Fumitoshi Yamashita and Masami Wada

It is certified that error appears in the above-indentified patent and that said Letters Patent is hereby corrected as shown below:

Please replace Sheet 10 of 10, Figures 16 and 17, to correct spelling of "INTRINSIC" on Fig. 16 and to add slash marks along the x and y axes of Fig. 17.

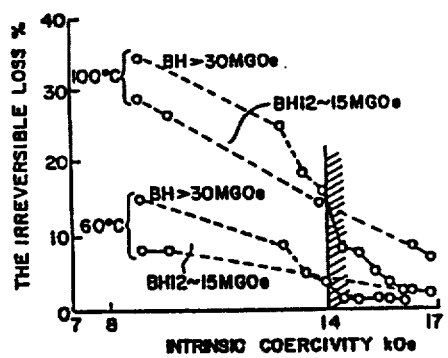

FIG. 16

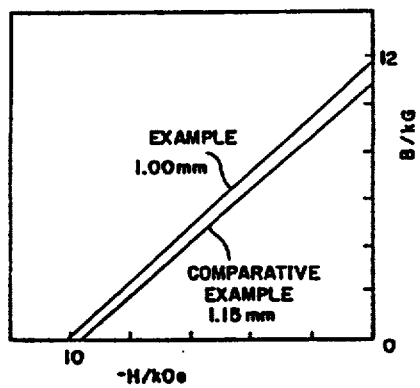

FIG. 17

UNITED STATES PATENT AND TRADEMARK OFFICE
CERTIFICATE OF CORRECTION

PATENT NO. : 5,178,691
DATED : January 12, 1993
INVENTOR(S) : Fumitoshi Yamashita and Masami Wada It is certified that error appears in the above-indentified patent and that said Letters Patent is hereby corrected as shown below:

Column 1, line 2, in the title, delete "ELEMENT-IRON" and insert therefor --ELEMENT-IRON-BORON--.

Column 2, line 10, after "element-iron-boron" insert --magnet--.

Column 3, line 46, delete "element-iron" and insert therefor --element-iron-boron--.

Column 5, line 13, delete "element-iron" and insert therefor --element-iron-boron--.

Column 5, line 34, after "a film" delete "for" and insert therefor --of--.

Column 6, lines 31 and 32, after "specific" delete "heat(-cal/°C. g) and insert therefor --heat (cal/°C. g)--.

UNITED STATES PATENT AND TRADEMARK OFFICE
CERTIFICATE OF CORRECTION

PATENT NO. : 5,178,691
DATED : January 12, 1993
INVENTOR(S) : Fumitoshi Yamashita and Masami Wada It is certified that error appears in the above-indentified patent and that said Letters Patent is hereby corrected as shown below:

Column 6, lines 48 to 50, after "to 70 volume %", delete "in which each TiN phase starts contacting together in the sintered composite ceramics, to 70 volume %".

Column 7, lines 14 and 15, after "seconds." delete "Moreover, the specific electric resistance of ends."

Column 7, line 27, before "of the" delete "reductions" and insert therefor --reduction--.

Column 7, line 38, after "element-iron-boron" insert --alloy--.

Column 7, line 45, after "earth", delete "element-iron" and insert therefor --element-iron-boron--.

Column 8, line 20, after "of the" insert --intrinsic coercivity without the reduction of the--.

Column 8, line 23, after "of the" delete "R-TN-B" and insert therefor --R-TM-B--.

UNITED STATES PATENT AND TRADEMARK OFFICE
CERTIFICATE OF CORRECTION

PATENT NO. : 5,178,691
DATED : January 12, 1993
INVENTOR(S) : Fumitoshi Yamashita and Masami Wada It is certified that error appears in the above-indentified patent and that said Letters Patent is hereby corrected as shown below:

Column 8, line 42, after "earth" delete "element-iron" and insert therefor --element-iron-boron--.

Column 9, lines 67 to 68, after "earth" delete "ele-ment-iron" and insert therefor --element-iron-boron"

Column 10, line 8, delete "15" and insert therefor --16--.

Column 12, line 35, after "the ratio" delete "f" and insert therefor --of--.

Column 13, line 57, after "earth" delete "element-iron" and insert therefor --element-iron-boron--.

Column 15, line 29, after "sectional" delete "are" and insert therefor --area--.

Column 15, line 35, after "increased" delete "such" and insert therefor --much--.

UNITED STATES PATENT AND TRADEMARK OFFICE
CERTIFICATE OF CORRECTION

PATENT NO. : 5,178,691

DATED : January 12, 1993

INVENTOR(S) : Fumitoshi Yamashita and Masami Wada

It is certified that error appears in the above-indentified patent and that said Letters Patent is hereby corrected as shown below:

Column 17, line 16, after "set" delete "froth" and insert therefor --forth--.

Column 18, line 21, after "mean" delete "rain" and insert therefor --grain--.

Signed and Sealed this

Thirteenth Day of September, 1994

BRUCE LEHMAN

Attest:

Attesting Officer

Commissioner of Patents and Trademarks

UNITED STATES PATENT AND TRADEMARK OFFICE
CERTIFICATE OF CORRECTION

| | | |
|---|---|---|
| PATENT NO. | : | 5,178,691 |
| DATED | : | January 12, 1993 |
| INVENTOR(S) | : | Fumitoshi Yamashita et al. |

It is certified that error appears in the above-identified patent and that said Letters Patent is hereby corrected as shown below:

column 1, lines 27 & 28, change "Japanese Patent Publication No. Laid Open" to read --Japanese Laid-Open Patent Publication No.--.

column 1, line 37, change "know" to --known--.

colum 2, line 3, change "600°" to --600--.

column 2, line 27, change "coeffcent" to --coefficient--.

column 3, line 1, change "kg" to --kG--.

column 5. line 33, change "23b'" to --2b'--.

UNITED STATES PATENT AND TRADEMARK OFFICE
CERTIFICATE OF CORRECTION

PATENT NO. : 5,178,691
DATED : January 12, 1993
INVENTOR(S) : Fumitoshi Yamashita et al.

It is certified that error appears in the above-identified patent and that said Letters Patent is hereby corrected as shown below:

column 7, line 33, change "is" to --it--.

column 8, line 2, change "basis" to --basic--.

column 8, line 37, change "add" to --added--.

column 9, line 20, change "19,960" to --19.960--.

column 10, line 9, between "The" and "recoil" insert --above--.

column 12, line 36, change "are S" to --area S--.

column 12, line 36, change "are $S_0$" to --area $S_0$--.

column 12, line 62, change "are S" to --area S--.

column 12, line 62, change "are $S_0$" to --area $S_0$--.

column 12, line 68, between "ratio" and "$S/S_0$" insert --,--.

UNITED STATES PATENT AND TRADEMARK OFFICE
CERTIFICATE OF CORRECTION

PATENT NO.   : 5,178,691
DATED        : January 12, 1993
INVENTOR(S)  : Fumitoshi Yamashita et al.

It is certified that error appears in the above-identified patent and that said Letters Patent is hereby
corrected as shown below:

column 13, line 48, change "20°" to --20--.

column 14, line 9, change "60°" to --60--.

column 18, line 45, change "or" to --of--.

column 18, line 46, change "are" to --area--.

Signed and Sealed this

Twenty-fifth Day of October, 1994

Attest:

BRUCE LEHMAN

Attesting Officer                Commissioner of Patents and Trademarks